(12) United States Patent
Lee et al.

(10) Patent No.: US 8,884,941 B2
(45) Date of Patent: Nov. 11, 2014

(54) DISPLAY SYSTEM AND POWER CONTROL METHOD THEREOF

(75) Inventors: Soo-Man Lee, Gyeongsangbook-do (KR); Sea-La Park, Seoul (KR); Kee Hyoung Lee, Daegu (KR); Won Jung Nam, Goomi-si (KR); Eun Ji Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1308 days.

(21) Appl. No.: 12/227,013

(22) PCT Filed: Jul. 19, 2006

(86) PCT No.: PCT/KR2006/002819
§ 371 (c)(1),
(2), (4) Date: Jul. 13, 2009

(87) PCT Pub. No.: WO2007/117057
PCT Pub. Date: Oct. 18, 2007

(65) Prior Publication Data
US 2010/0066765 A1 Mar. 18, 2010

(30) Foreign Application Priority Data
Apr. 11, 2006 (KR) .................. 10-2006-0032789

(51) Int. Cl.
*G09G 5/00* (2006.01)
*G06F 1/32* (2006.01)
*H04N 5/63* (2006.01)
*G09G 3/34* (2006.01)
*G09G 3/36* (2006.01)
*G09G 3/22* (2006.01)

(52) U.S. Cl.
CPC .......... H04N 5/63 (2013.01); *G09G 2330/022* (2013.01); *G09G 2320/064* (2013.01); *Y02B 60/1242* (2013.01); *G09G 3/3406* (2013.01); G06F 1/3265 (2013.01); *G09G 2330/021* (2013.01); *G09G 3/3611* (2013.01); *G09G 3/22* (2013.01); *G09G 5/006* (2013.01); G09G 5/003 (2013.01); G06F 1/3203 (2013.01)
USPC ............. 345/211; 345/204; 345/690; 345/87; 345/76; 362/249.02; 40/544; 713/320

(58) Field of Classification Search
USPC .......... 345/204, 87, 690; 340/815.45, 815, 45
See application file for complete search history.

(56) References Cited

U.S. PATENT DOCUMENTS

| 5,078,476 A | 1/1992 | Shin ............................... 359/48 |
| 6,020,879 A | 2/2000 | Nakabayashi ................. 345/212 |

(Continued)

FOREIGN PATENT DOCUMENTS

| EP | 1 536 404 A1 | 6/2005 |
| GB | 2 415 851 A | 1/2006 |

(Continued)

OTHER PUBLICATIONS

European Search Report dated Nov. 2, 2009.

(Continued)

*Primary Examiner* — Grant Sitta
(74) *Attorney, Agent, or Firm* — KED & Associates LLP (57) ABSTRACT

A display system is provided The display system includes a power source unit for supplying power; a signal input unit for receiving a video signal from the outside; a video processor for converting a format of the video signals received from the signal input unit into a displayable format; a display unit electrically connected with the power source unit and displaying an image corresponding to a signal from the video signal processor; a light-emitting unit electrically connected with the power source unit and including at least two light sources; and a controller for judging an operating mode on the basis of a signal input from the signal input unit and controlling power supplied to the display unit and the light-emitting unit depending on the judged operating mode.

28 Claims, 6 Drawing Sheets

(56) References Cited

U.S. PATENT DOCUMENTS

| | | | | |
|---|---|---|---|---|
| 6,054,981 | A * | 4/2000 | Kimoto et al. | 345/211 |
| 6,069,619 | A | 5/2000 | Kim | 345/211 |
| 6,476,884 | B1 * | 11/2002 | Shao | 349/58 |
| 6,593,975 | B1 | 7/2003 | Oh | 348/730 |
| 7,015,988 | B2 * | 3/2006 | Ogino | 349/62 |
| 7,034,814 | B2 * | 4/2006 | Gong et al. | 345/211 |
| 7,385,359 | B2 * | 6/2008 | Dowling et al. | 315/292 |
| 7,463,163 | B2 * | 12/2008 | Wu | 340/815.45 |
| 2003/0043125 | A1 | 3/2003 | Kojima et al. | 345/204 |
| 2003/0090864 | A1 * | 5/2003 | Kuo | 361/683 |
| 2004/0014489 | A1 * | 1/2004 | Miyachi et al. | 455/550.1 |
| 2005/0030306 | A1 | 2/2005 | Lan et al. | 345/211 |
| 2005/0188569 | A1 * | 9/2005 | Derose | 40/544 |

FOREIGN PATENT DOCUMENTS

| | | |
|---|---|---|
| JP | 09-135399 A | 5/1997 |
| KR | 10-1997-0049301 A | 7/1997 |
| KR | 20-1998-0064333 U | 11/1998 |
| KR | 10-1999-0047583 A | 7/1999 |
| WO | WO 03/007139 A2 | 1/2003 |

OTHER PUBLICATIONS

Korean Office Action dated Jul. 26, 2007 issued in Application No. 10-2006-0032789.

Korean Notice of Allowance dated Jan. 21, 2008 issued in Application No. 10-2006-0032789.

International Search Report dated Feb. 17, 2009 issued in Application No. PCT/KR2006/002819.

* cited by examiner

DISPLAY SYSTEM AND POWER CONTROL METHOD THEREOF

TECHNICAL FIELD

The present invention relates to a display system for displaying an image and a power control method thereof.

BACKGROUND ART

A general display system displays an image on a display module such as a cathode ray tube (CRT), a liquid crystal panel, electro-luminescence panel, and a plasma display panel.

For this purpose, the display system processes video data or video signals from a video information source into a form that is required by the display module. The video data or video signals processed into the form required by the display module are provided to and displayed on the display module.

Also, the general display system operates in a display power management (DPM) mode in order to minimize power consumption when an expressed image does not change.

At this point, during the DPM mode, it is judged that whether there are horizontal synchronization signals or vertical synchronization signals, and when none of the horizontal synchronization signals and vertical synchronization signals is input to a monitor, it is judged that the monitor is not used, and a microcomputer inside the monitor supplies power to only essential elements for a stand-by state, and cuts off power supplied to other elements, particularly elements that consume high power.

The DPM mode is divided into a normal mode and a power-saving mode including a suspend mode and a stand-by mode.

Also, a DPM mode in a flat panel display device such as a liquid crystal display (LCD) device may be divided into a normal mode and a stand-by mode, which is a power-saving mode.

Since a display system operates in at least two operating modes, it is required to control power depending on an operating mode in which the display system operates.

However, it has not been possible to allow a user to clearly know an operating mode in which the display system currently operates.

Also, as a user's demands are diversified, a desire to utilize the display system as an interior product suitable for creating a variety of atmospheres as well as a simple display device is increasing.

DISCLOSURE OF INVENTION

Technical Problem

An object of the present invention is to provide a display system and a power control method thereof that allow power control reflecting a variety of operating modes.

Another object of the present invention is to provide a display system and a power control method thereof that are adapted to easily inform a user of an operating mode in which the display system operates.

Still another object of the present invention is to provide a display system and a power control method thereof that can promote a user's sentiment and satisfy various user desires.

Technical Solution

According to one aspect of the present invention, there is provided a display system including: a power source unit for supplying power; a signal input unit for receiving video signals from the outside; a video processor for converting a format of the video signals received from the signal input unit into a displayable format; a display unit electrically connected with the power source unit and displaying an image corresponding to a signal from the video signal processor; a light-emitting unit electrically connected with the power source unit and including at least two light sources; and a controller for judging an operating mode according to a signal input from the signal input unit and controlling power supplied to the display unit and the light-emitting unit depending on the judged operating mode.

According to another aspect of the present invention, there is provided a display system including: a power source unit for supplying power; a signal input unit for receiving video signals from the outside; a video processor for converting a format of the video signals received from the signal input unit into a displayable format; a display unit for displaying an image corresponding to a signal from the video signal processor; a light-emitting unit including at least two light sources; a controller for judging an operating mode on the basis of a signal input from the signal input unit and controlling power supplied to the display unit and the light-emitting unit depending on the judged operating mode; and a switching element for turning on/off power of one of the light-emitting unit and the display system.

According to further another aspect of the present invention, there is provided a method of controlling power of a display system, the method including: judging an operating mode of a display system on the basis of an input video signal; and when the operating mode is a power-saving mode, cutting off power of a display unit and supplying power to a light-emitting unit formed in a support stand supporting the display unit.

Advantageous Effects

A display system and a power control method thereof provide the following effects.

First, it is possible to determine an operating mode on the basis of a power-on/off command from a user and a video signal (or data), and control supplying of a power voltage of a system according to the determined mode.

Second, it is possible to determine an operating mode on the basis of a power-on/off command from a user and a video signal (or data), and a user can easily recognize an operating mode of a display system through light-emitting patterns of a light source by allowing the light-emitting patterns of the light source such as light-emitting diodes (LEDs) to be changed according to the determined operating mode.

Third, since an operating mode of a display system can be more easily recognized, a reliability of a display system can be improved.

Fourth, it is possible to promote a user's sentiment by providing a variety of light-emitting patterns according to an operating mode of a display system so that a user can experience various feelings such as comfortableness, convenience, and delightfulness.

BEST MODE FOR CARRYING OUT THE INVENTION

Hereinafter, preferred embodiments of the present invention will be described in detail with reference to accompanying drawings.

In the descriptions, an operating mode of a display system is roughly divided into a power-on mode and a power-off mode. The power-on mode includes only a signal input mode that includes a normal mode and a power-saving mode (or display power management (DPM) mode), or may include even a driving mode. In other words, the power-on mode can include only the signal input mode or include both the driving mode and the signal input mode.

When the power-on mode includes the driving mode, a display system enters a normal mode after performing the driving mode. The driving mode, the normal mode, the power-saving mode, the power-off mode, and the power-on mode will be clearly revealed through descriptions of embodiments associated with the accompanying drawings.

A display system according to the present invention will be described below in more detail with reference to the accompanying drawings.

Figure 1:
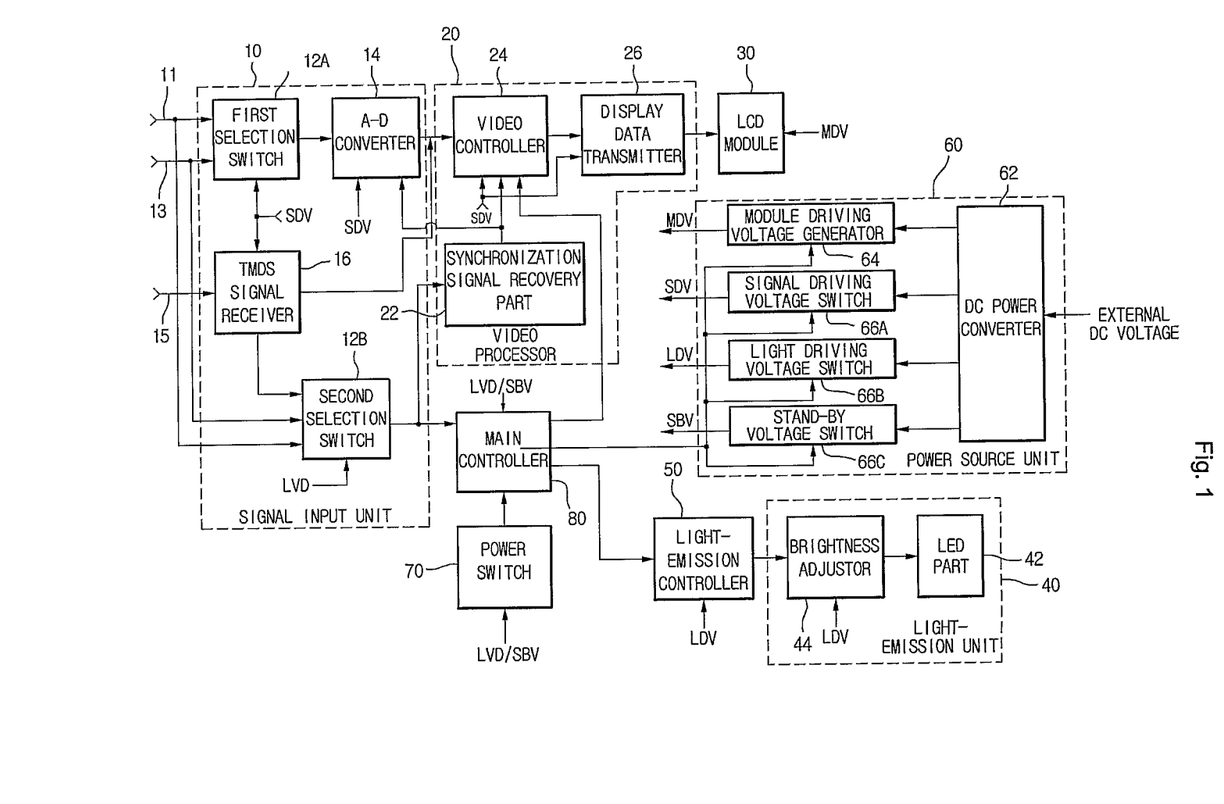
FIG. 1 is a block diagram of a display system according to the present invention.

FIG. 1 is a block diagram of a display system according to the present invention.

Referring to FIG. 1, the display system includes a power source unit 60 for supplying power to the display system, a signal input unit 10 electrically connected to the power source unit 60 and receiving a video signal from the outside, a video processor 20 electrically connected to the power source unit 60, for converting a format of the video signals received from the signal input unit 10 into a displayable format; an LCD module 30 electrically connected to the power source unit 60, for displaying an image corresponding to a signal from the video signal processor 20; a light-emitting unit 40 electrically connected to the power source unit 60 and including at least two light sources; and a main controller 80 electrically connected to the power source unit 60, for judging an input mode of a signal input from the signal input unit 10, and controlling power supplied to the LCD module 30 and the light-emitting unit 40 according to the determined input mode.

Here, the signal input unit 10 includes a first selection switch 12A for selectively outputting a signal input via first and second input lines 11 and 13, a transmission minimized differential signaling (TMDS) signal receiver 16 for receiving a minimum transition TMDS signal input via a third input line 15, a second switch 12B for selectively outputting signals input via the first and second input lines 11 and 13, and an output from the TMDS signal receiver 16, and an analog-to-digital (AD) converter 14 for converting an analog signal output from the first selection switch 12A into a digital signal.

Also, the video processor 20 includes a video controller 24 connected to the AD converter 14 and the TMDS signal receiver 16, a synchronization signal recovery part 22 connected to the second selection switch 12B, and a display data transmitter 26.

The power source unit 60 includes a DC power converter 62 for receiving an external DC voltage and converting the DC voltage into power required for each mode, a module driving voltage generator 64 for generating a module driving voltage according to a power converted by the DC power converter 62, a signal driving voltage switch 66A for switching a signal driving voltage according to a voltage converted by the DC power converter 62, a light driving voltage switch 66B for outputting a light driving voltage according to a voltage converted by the DC power converter 62, and a standby switch 66C for outputting a standby-voltage according to a voltage converted by the DC power converter 62.

Also, the display system further includes a light-emission controller 50 for controlling driving of the light-emitting unit 40 in response to a control signal from the main controller 80, and a power switch 70 for controlling power supplied to the main controller 80.

The light-emitting unit 40 includes at least one LED 42 and a brightness adjustor 44 for controlling brightness of the LED 42 in response to a control signal from the light-emission controller 50. At this point, the LED 42 may be replaced by other light source devices (e.g., cold cathode fluorescent lamps (CCFL) and incandescent lamps).

In operation, the signal input unit 10 selectively supplies analog color signals and synchronization signals from the first and second input lines 11 and 13, and digital color signals and synchronization signals from the third input line 15 to the video processor 20. At this point, color signals from the first and second input lines 11 and 13 are converted into digital data and provided to the video processor 20.

Also, the signal input unit 10 includes the first selection switch 12A connected to the first and second input lines 11 and 13, and the AD converter 14 in order to selectively deliver a video signal. The signal input unit 10 selects one of a normal color signal from the first input line 11 and a digital-analog (DA) converted color signal from the second input line 13 and provides the selected color signal to the AD converter 14.

A color signal selecting operation by the first selection switch 12A is controlled by the main controller 80, which will be described later, and the AD converter 14 converts color signals from the first selection switch 12A into digital data, and provides the converted digital data to the video processor 20.

The TMDS signal receiver 16 receives a TMDS signal from a third video information source (not shown) via the third input line 15, decodes color data and synchronization signals from the received TMDS signal, and supplies the decoded color data to the video processor 20 and the second selection switch 12B.

The second selection switch 12B receives synchronization signals via the first input line 11, DA converted synchronization signals via the second input line 13 as well as decoded synchronization signals from the TMDS signal receiver 16, selects one of the three kinds of synchronization signals, and provides the selected synchronization signals to the synchronization signal recovery part 22 of the video processor 20, and the main controller 80.

Also, the video processor 20 converts a format of color data input simultaneously with synchronization signals from the signal input unit 10 into a format required by the LCD module 30, and provides the format-converted color data together with the synchronization signals to the LCD module 30.

For this purpose, the synchronization signal recovery part 22 recovers a frequency and a waveform of synchronization signals selected by the second selection switch 12B to original frequency and waveform. For a recovery operation, the synchronization signal recovery part 22 includes a phase locked loop.

Also, synchronization signals recovered by the synchronization signal recovery part 22 include a pixel clock, horizontal synchronization signals, vertical synchronization signals, or may include only a pixel clock, horizontal synchronization signals. These recovered synchronization signals are provided to the AD converter 14 and the video controller 24.

Unlike this, the AD converter 14 may receive only a pixel clock among recovered synchronization signals. The pixel clock controls a conversion period of the AD converter 14. The video controller 24 converts a format of color data from the AD converter 14 or color data from the TMDS signal receiver 16 into a format required by the LCD module 30 using synchronization signals recovered by the synchronization signal recovery part 22.

Also, color data whose format has been converted by the video controller 24 are transmitted to the LCD module 33 together with synchronization signals and data enable signals via the display data transmitter 26. The display data transmitter 26 allows the color data from the video controller 24, synchronization signals, and data enable signals to be encoded in a predetermined signal type (e.g., low voltage differential signaling) and transmitted to the LCD module 30.

Also, the LCD module 30 receives color data and synchronization signals transmitted via the display data transmitter 26 and drives pixels according to color data in synchronization with synchronization signals to display an image.

Though the LCD module 30 has been described as an example of a display module in the display system according to an embodiment of the present invention, it would be obvious to a person of an ordinary skill in the art that the LCD module 30 can be replaced by one of a cathode ray tube (CRT), a plasma display module, an electro-luminance display module, etc.

Therefore, the LCD module 30 operates in a normal mode or a power-saving mode (i.e., display power management (DPM) mode) depending on whether a synchronization signal and/or a color signal (or color data) is received from the first to third input lines 11-13.

That is, the normal mode means an operating mode of a display system that operates the display unit in a case where both a synchronization signal and a color signal (or color data) are provided via the input lines. The power-saving mode means an operating mode of a display system that does not operate the display unit in a case where a synchronization signal or a color signal (or color data) is not provided via the first to third input lines 11-15.

Also, the brightness adjustor 44 adjusts a current amount or a voltage level of a driving signal provided to at least two LEDs included in an LED part 42 to an amount and a level designated by a user, thereby adjusting brightness of the LEDs. For this purpose, the brightness adjustor 44 includes a switch (e.g., a key switch, a touch switch, or an access detection switch) for receiving a level command for brightness from a user Also, the brightness adjustor 44 may be realized using a program performed by a processor (e.g., a central processing unit (CPU) or a microcomputer) having an operation function. In a case where the brightness adjustor 44 is realized using the program, a switch element included in the brightness adjustor 44 can be connected to the light-emission controller 50 or the main controller 80.

Therefore, the light-emission controller 50 individually controls the at least two LEDs within the LED part 42 connected via the brightness adjustor 44 to allow the at least two LEDs to emit light in various patterns, so that a user can easily recognize an operating mode of the display system through such various light-emission patterns of the LEDs.

Here, to explain the light-emission patterns of the LEDs included in the LED part 42, it is assumed that the operating mode of the display system is divided into the power-on mode including the driving mode, the normal mode, and the power-saving mode, and the power-off mode. Also, it can be assumed that the operating mode of the display system is divided into the power-on mode including only the signal input mode divided into the normal mode and the power-saving mode, and the power-off mode.

In other words, it is assumed that the operating mode is divided into a driving mode that allows power to be supplied to all circuits of the display system in response to a power-on command, and a power-off mode that allows power supplied to other circuits that exclude a control circuit of a display system to be cut off in response to a power-off command besides the normal mode according to the inputting of a video signal and the DPM mode.

In addition, an operating mode of a display system sequentially changing from a driving mode to a normal mode, a power-saving mode, and to a power-off mode is assumed and an operating mode of a display system sequentially changing from a normal mode to a power-saving mode and a power-off mode is assumed.

Figure 7:
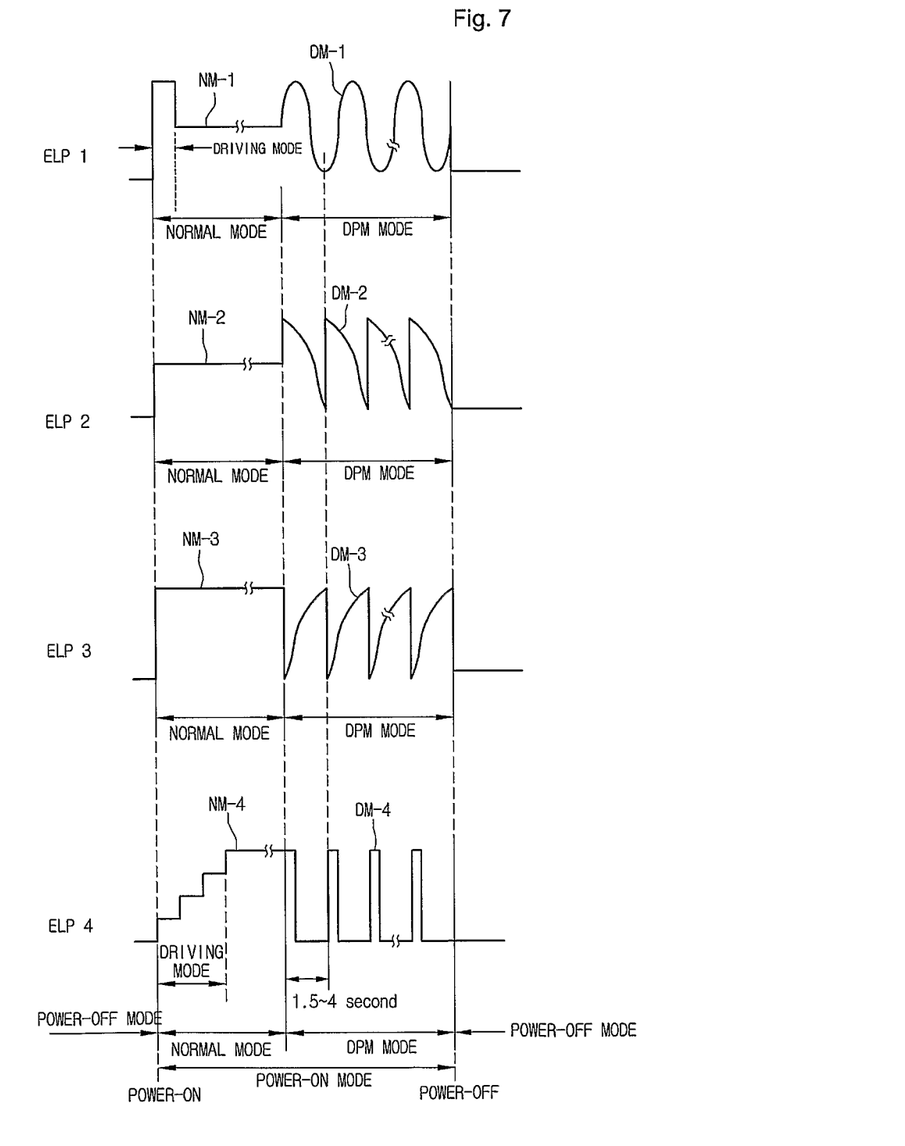
FIG. 7 is a waveform diagram explaining sequential light-emitting patterns of the LED part illustrated in FIG. 1.

First, when the operating mode of the display system sequentially changes from a driving mode up to a power-off mode, the light-emission controller 50 sequentially responses light-emission mode commands from the main controller 80 to allow the LED part 42 within the light-emission unit 40 to emit light in an order shown in patterns of a first emitting-light pattern 1 (ELP1) or a fourth ELP4 of FIG. 7. That is, referring to the first sequential ELP1 to the fourth ELP4, a light-emission pattern informing a user of a driving mode is included in a starting section of a light-emission pattern (NM-1, NM-4) informing a user of a normal mode.

To allow the LED part 42 to emit light according to light-emitting patterns having a n order illustrated in the first sequential ELP1, the light-emission controller 50 supplies a pulse width modulation (PWM) signal (a maximum amount of current signal or a maximum level of voltage signal) having a maximum impulse coefficient for a predetermined period starting from a time at which a power-on command is input to the LED part 42, and lowers an impulse coefficient of the PWM signal to an arbitrary intermediate value lower than a maximum value to allow an ELP of a brightest operating mode and an ELP of a normal mode that is weakened to a predetermined intermediate level to sequentially appear.

In this case, after emitting light at maximum brightness, the LEDs within the LED part 42 emit light at an intermediate level until an operating mode of the display system changes into a power-saving mode. That is, the display system operates for a predetermined period in a driving mode at an instant a power-on command is input, and changes to a normal mode, displaying an operating state to a user.

At this point, when an operating mode of the display system changes to a power-saving mode, the light-emission controller 50 supplies a PWM signal (or a current signal or a voltage signal) to at least two LEDs within the LED part 42 included in the light-emitting unit 40. At this point, the PWM signal is repeated in the form where an impulse coefficient of the PWM signal gradually reduces during a predetermined section from a maximum value to a minimum value (i.e., 0) and then gradually increases during a predetermined section from a minimum value (i.e., 0) to a maximum value.

With such a construction, the LEDs within the LED part 42 repeated to emit light at brightness that gradually reduces from a maximum level to a minimum level and emit light at brightness that gradually increases from a minimum level to a maximum level (as shown in the first DLP pattern (DM-1) in the first sequential ELP1 of FIG. 7).

In other words, the LEDs emit light at brightness that gradually increases from a minimum level to a maximum level and gradually reduces to the minimum level again, thereby repeating periodic light emission. Such light emitting patterns where the fade-in and fade-out of brightness are repeated allow a user to recognize that the display system operates in a power-saving mode (i.e., a DPM mode).

Also, a period where the fade-in and the fade-out of brightness are repeated is set to within about 1.5-4 seconds for which a user can experience stability, comfortableness, and pleasant feeling. An ELP of the LED part 42 where the fade-in and fade-out of brightness are repeated is maintained until a power-saving mode is released or a power-off command is input.

When a user inputs a power-off command, the light-emission controller 50 cuts off a PWM signal (or a current signal or a voltage signal) supplied to the LED part 42 to put out light of the LEDs within the LED part 42.

Therefore, to allow the LED part 42 to emit light according to light-emitting patterns having an order illustrated in the first sequential ELP1, the light-emission controller 50 supplies a pulse width modulation (PWM) signal (a current signal that gradually increases from zero to a maximum value or a voltage signal that gradually increases from zero to a maximum level) having a maximum impulse coefficient that gradually increases from zero to a maximum value from a time at which a power-on command is input, to the LEDs within the LED part 42, to allow the LEDs to emit light in patterns where brightness gradually increases from a light-out state to a maximum level as in the ELP4 of FIG. 7.

Brightness that gradually increases from the light-out state to the maximum level allows a user to recognize a driving mode in which the display system starts to display an image. The light-emission controller 50 supplies a PWM signal having a maximum impulse coefficient (or a maximum amount of a current signal or a maximum level of a voltage signal) to the LEDs within the LED part 42 included in the light-emitting unit 40 to allow the LEDs within the LED part 42 to emit light at maximum level brightness as shown in the fourth normal pattern (NM-4) in the fourth sequential ELP4 of FIG. 7.

Also, an ELP of the LEDs where the LEDs within the LED part 42 emit light at the maximum level brightness allows a user to recognize that the display system operates in a normal mode where an image is normally displayed. The ELP of the LEDs representing the normal mode is maintained until an operating mode of the display system changes to a power-saving mode. When the operating mode of the display system changes to the power-saving mode, the light-emission controller 50 supplies a PWM signal (or a current signal or a voltage signal) whose impulse coefficient has a maximum value to the LEDs within the LED part 42 every relatively long period.

Accordingly, the LEDs within the LED part 42 emit light one time every relatively long period as in the fourth DPM pattern (DM-4) of the fourth sequential ELP4 illustrated in FIG. 7. In other words, the light-emission controller 50 allows the LEDs to emit light in a relatively slow flickering manner. The slow flickering ELP of the LEDs allows a user to recognize that the display system operates in a power-saving mode (i.e., a DPM mode).

Also, a flickering period of the LEDs is set within about 1.5-4 seconds for which a user can experience stability, comfortableness, and pleasant feeling. It is desirable to set the flickering period of the LEDs to a range of about 2-3 seconds close to a human breathing period. The ELP of the power-saving mode is maintained until the power-saving mode is released or a power-off command is input. At this point, when a user inputs a power-off command, the light-emission controller 50 cut off a PWM signal (or a current signal or a voltage signal) supplied to the LED part 42 to put out light of the LEDs within the LED part 42.

Next, when an operating mode of the display system sequentially changes from a normal mode to a power-off mode, the light-emission controller 50 sequentially responses to light-emission commands from the main controller 80 to control the LED part 42 within the light-emitting unit 40 to emit light according to ELPs shown in an order of the second sequential ELP2 or the third sequential ELP3 illustrated in FIG. 7.

That is, referring to the ELP 2 and ELP 3, ELPs (NM-2 and NM-3) informing a user of a normal do not include an ELP informing a user of a driving mode.

To allow the LED part 42 to emit light according to light-emitting patterns having an order illustrated in the second sequential ELP2, the light-emission controller 50 supplies a pulse width modulation (PWM) signal (a current signal or a voltage signal) having a predetermined intermediate impulse coefficient lower a maximum value from a time at which a power-on command is input, to the LEDs within the LED part 42 to allow the LEDs to emit light in patterns of a normal mode where the LEDs emit light at brightness of a predetermined intermediate level.

Also, the patterns of the normal mode are maintained until an operating mode of the display system changes to a power-saving mode. When the operating mode of the display system changes to the power-saving mode, the light-emission controller 50 supplies a PWM signal (or a current signal or a voltage signal) to the LEDs within the LED part 42 included in the light-emitting unit 40. At this point, an impulse coefficient of the PWM signal repeats to gradually change from a maximum value to a minimum value (i.e., zero).

With such a construction, the LEDs repeat to emit light at brightness that gradually reduces from a maximum level to a minimum level shown in the second DLP pattern (DM-2) of the second sequential ELP2 of FIG. 7. In other words, the LEDs emit light in patterns where brightness of the LEDs gradually reduces from maximum brightness to a light-out state. The ELP where fade-out of brightness repeats allows a user to recognize that the display system operates in a power-saving mode (i.e., a DPM mode).

Also, a period where the fade-in and the fade-out of brightness are repeated is set to within about 1.5-4 seconds for which a user can experience stability, comfortableness, and pleasant feeling. An ELP of the LED part 42 where the fade-in and fade-out of brightness are repeated is maintained until a power-saving mode is released or a power-off command is input.

When a user inputs a power-off command, the light-emission controller 50 cuts off a PWM signal (or a current signal or a voltage signal) supplied to the LED part 42 to put out light of the LEDs within the LED part 42.

On the other hand, to allow the LED part 42 to emit light according to light-emitting patterns having an order illustrated in the third sequential ELP3, the light-emission controller 50 supplies a PWM signal (a current signal or a voltage signal) having an impulse coefficient of a maximum value from a time at which a power-on command is input, to the LEDs within the LED part 42 to allow the LEDs to emit light in patterns of a normal mode where the LEDs emit light at maximum brightness.

Also, the patterns of the normal mode where the LEDs emit light at maximum brightness are maintained until an operating mode of the display system changes to a power-saving mode. When the operating mode of the display system changes to the power-saving mode, the light-emission controller 50 supplies a PWM signal (or a current signal or a voltage signal) to the LEDs within the LED part 42 included in the light-emitting unit 40. At this point, an impulse coefficient of the PWM signal repeats to gradually change from a minimum value (i.e., zero) to a maximum value.

With such a construction, the LEDs repeat to emit light at brightness that gradually reduces from a minimum level to a maximum level shown in the third DLP pattern (DM-3) of the third sequential ELP3 of FIG. 7. In other words, the LEDs emit light in patterns where brightness of the LEDs gradually increases from minimum brightness to maximum brightness. The ELP where fade-in of brightness repeats allows a user to recognize that the display system operates in a power-saving mode (i.e., a DPM mode).

Also, a period where the fade-in of brightness is repeated is set to within about 1.5-4 seconds for which a user can experience stability, comfortableness, and pleasant feeling. An ELP of the LED part 42 where the fade-in of brightness is repeated is maintained until a power-saving mode is released or a power-off command is input. At this point, when a user inputs a power-off command, the light-emission controller 50 cuts off a PWM signal (or a current signal or a voltage signal) supplied to the LED part 42 to put out light of the LEDs within the LED part 42.

Though four ELPs of the LEDs within the LED part 42 according to an operating mode of the display system have been described as illustrated in FIG. 7, it would be obvious to a person of an ordinary skill in the art that these ELPs are merely exemplary and combination of ELPs of the LED according to an operating mode of the display system can be realized in various patterns different from those illustrated in FIG. 7.

For example, the display system can be operated such that a normal mode and a power-saving mode are performed in turns at least two times before a power-off command is input. Accordingly, an ELP of the normal mode and an ELP of the power-saving mode can appear at least two times. In addition, a power-off command can be input during a normal mode, not a power-saving mode of the display system. In this case, the LEDs within the LED part 42 emit light in an ELP of the normal mode and put out light.

To allow the LEDs within the LED part 42 to emit light in various patterns, the light-emission controller 50 may include a processor (i.e., a central process unit or micro-computer) having an operation function. Also, the light-emission controller 50 including the processor can realize the brightness adjustor 44 using a program. In this case, the light-emission controller 50 can include a switch element included in the brightness adjustor 44.

A display system according to the present invention will be described again with reference to FIG. 1. The display system includes the power source unit 60 for supplying a voltage required for driving the system. The power source unit 60 selectively supplies driving voltages to the signal input unit 10, the video processor 20, the LCD module 30, and the light-emitting unit 40 according to an operating mode of the display system.

That is, when the display system operates in one of a power-on mode and a normal mode, the power source unit 60 supplies driving voltages to all circuits within the system. On the other hand, when the display system operates in a power-saving mode (i.e., a DPM mode), the power source unit 60 cuts off the driving voltages (i.e., an MDV and SDV) supplied to the LCD module 30, the video processor 20, the first selection switch 12A, the AD converter 14, and the TMDS signal receiver 16 within the signal input unit 10. However, during a power-saving mode, power can be addition ally supplied to some of circuits while power supplied to a display module such as the LCD module is cut off.

On the other hand, during the power-saving mode, a light driving voltage (LDV) is supplied to the second selection switch 12B, the main controller 80, the light-emitting unit 80, and the light-emission controller 50. Last, when the display system operates in a power-off mode (i.e., a standby mode), driving voltages MDV, SDV, and LDV supplied to the rest circuits that exclude the main controller 80 and the power switch 70 are cut off.

In this case, since a standby voltage (SBV) having a lowest level is supplied to only the main controller 80 and the power switch 70, a power cut-off operation selectively performed by the power source unit 60 is controlled by the main controller 80.

To perform the selective power cut-off operation, the power source unit 60 includes the DC power converter 62 for receiving an external DC voltage, the module driving voltage generator 64, the signal driving voltage switch 66A, the light driving voltage switch 66B, and the stand-by switch 66C connected to the DC power converter 62. The DC power converter 62 generates a module voltage, a signal driving voltage (SDV), a light driving voltage (LDV), and a standby voltage (SBV) from the external DC voltage.

That is, the module driving voltage generator 64 generates the MDV required for driving the LCD module 30 using the module voltage from the DC power converter 62. The module driving voltage generator 64 includes an inverter circuit in order to generate the MDV. When the LCD module 30 is replaced by other display module, the module driving voltage generator 64 may not include the inverter circuit.

Only when the display system operates in one of a driving mode and a normal mode, the MDV is generated by the module driving voltage generator 64 and supplied to the LCD module 30, so that an operation of generating the MDV by the module driving voltage generator 64 is controlled by the main controller 80.

On the other hand, the signal driving voltage switch 66A selectively cuts off SDVs that are to be supplied from the DC power converter 62 to the synchronization signal recovery part 22, the video controller 24, the display data transmitter 26, the first selection switch 12A, the AD converter 14, and the TMDS signal receiver 16 depending on an operating mode of the display system. The signal driving voltage switch 66A allows the SDV to be supplied to the synchronization signal recovery part 22, the video controller 24, the display data transmitter 26, the first selection switch 12A, the AD converter 14, and the TMDS signal receiver 16 when the display system operates in a driving mode and/or a normal mode.

On the other hand, when the display system operates in one of a power-off mode and a power-saving mode (i.e., a DPM mode), the signal driving voltage switch 66A does allow the SDV not to be supplied to the synchronization signal recovery part 22, the video controller 24, the display data transmitter 26, the first selection switch 12A, the AD converter 14, and the TMDS signal receiver 16, so that a switching operation of the signal driving voltage switch 66A is controlled by the main controller 80.

The light driving voltage switch 66B selectively cuts off LDVs that are to be supplied to the second selection switch 12B, the brightness adjustor 44, the light-emission controller 50, the main controller 80, and the power switch 73 depending on an operating mode of the display system. At this point, the LDVs are cut off by the light driving voltage switch 66C only when the display system operates in a power-off mode, so that the LDVs are not supplied to the second selection switch 12B, the brightness adjustor 44, the light-emission controller 50, the main controller 80, and the power switch 70.

Also, the standby voltage switch 66C is driven in a complementary manner with the light driving voltage switch 66B to selectively cut off SBVs that are to be supplied from the DC power converter 62 to the main controller 80 and the power switch 70 to allow the SBVs to be supplied to the main controller 80 and the power switch 70 only when the display system operates in a power-off mode.

In other words, the SBV and the LDV are supplied to the power switch 70 and the main controller 80 in turns, and the switching operation of the light driving voltage switch 66B and the standby voltage switch 66C is controlled by the main controller 80. Also, a regulator (not shown) for maintaining a voltage level constant may be connected between the DC power converter 62 and each of the standby voltage switch 66C, the signal driving voltage switch 66A, and the light driving voltage switch 66B.

Also, the power switch 70 illustrated in the display system of FIG. 1 supplies a power-command detection signal of a predetermined logic value (e.g., a low or high logic value) to the main controller 80 whenever a user manipulates the power switch 70.

That is, the power-command detection signal contains a power-on command or a power-off command designated (i.e., input) by a user, and the main controller 80 inputting the power-command detection signal from the power switch 70 is connected to the second selection switch 12B.

The main controller 80 determines an operating mode of the display system depending on whether the power-command detection signal includes a power-on command or a power-off command, and whether there is a synchronization signal from the second selection switch 12B to control a power cut-off operation of the power source unit 60 (i.e., the module driving voltage generator 64, the signal driving voltage switch 66A, the light driving voltage switch 66B, and the standby voltage switch 66C) for supplying driving voltages to the circuits within the display system, so that the display system can be operate in the determined operating mode.

Also, the main controller 80 applies a light-emitting mode command according to the determined operating mode of the display system to the light-emission controller 50, so that the light-emission controller 50 allows the LED part 42 of the light-emitting unit 40 to emit light in an ELP corresponding to the determined operating mode of the display system.

A control method for allowing at least two LEDs within the LED part 42 to emit light in various patterns according to an operating mode of the display system will be described with reference to a flowchart illustrated in FIGS. 8 to 10.

Beside, the main controller 80 controls the video controller 24 to process video signals as well as controls a selecting operation of the first and second selection switches 12A and 12B. To control an operation of the display system, the main controller 80 includes a processor (i.e., a central process unit or micro-computer) having an operation function.

Also, the main controller including the processor can realize the brightness adjustor 44 using a program. In this case, the main controller 80 includes a switch element included in the brightness adjustor 44 and controls the light-emission controller 50 according to a user's brightness designation level from the switch element.

Further, the display system of FIG. 1 can further include a memory device between the main controller 80 and the light-emission controller 50. The memory device temporarily stores a light-emitting mode command that is to be transmitted from the main controller 80 to the light-emission controller 50. The temporal storing by the memory device can alleviate a program load of the main controller 80.

The memory device may be a register or an electrically erasable and programmable random access memory (EEPROM). It is desirable that the memory device is a nonvolatile memory device which can write data and does not lost data even when power is turned off.

Figure 2:
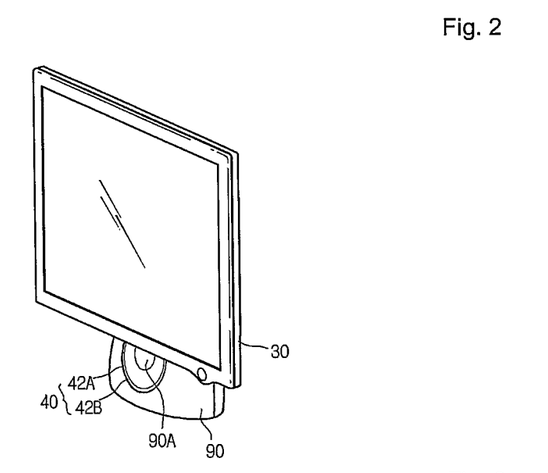
FIG. 2 is a perspective view of an appearance of a display system, explaining the LED part of FIG. 1 according to an embodiment of the present invention.

FIG. 2 is a perspective view of an appearance of a display system, explaining the LED part 42 of FIG. 1 according to an embodiment of the present invention.

In the display system of FIG. 2, a display panel 10 is supported to be rotatable within a predetermined angle range by a support stand 90, and a through hole 90A is formed in a center of the support stand 90.

Also, the LED part 42 of FIG. 1 is installed in the through hole 90A of the support stand 90, and the LED part 42 includes a cylindrical reflective body 42B prepared on a wall surface of the through hole 90A, and a circular LED array 42A installed in a front edge of the reflective body 42B. The LED array 42A is turned off or emit light in various patterns under control of the light-emission controller 50 illustrated in FIG. 1.

The cylindrical reflective body 42B is formed to have a structure generating an indirect lighting effect by reflecting light from the LED array 42A. The cylindrical reflective body 42B may include at least one color thin film. Further, the through hole 90A and the cylindrical reflective body 42B are formed to have inclination such that a diameter of the through hole 90A and the cylindrical reflective body 42B reduces along a portion from a front edge to a rear edge, so that a lighting effect is enhanced even more.

Also, the cylindrical reflective body 42B may be replaced by a cylindrical color filter suitable for transmitting and scattering light of a predetermined color. It is desirable that this cylindrical color filter is formed to have inclination together with the through hole 90A such that a diameter of the through hole 90A and the cylindrical color filter reduces along a portion from a front edge to a rear edge.

Figure 3:
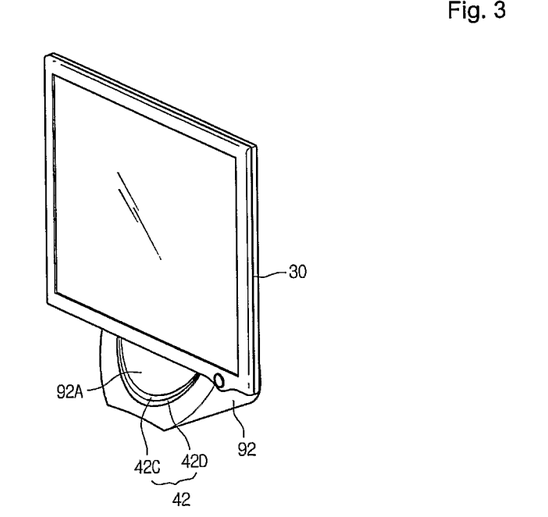
FIG. 3 is a perspective view of an appearance of a display system, explaining the LED part of FIG. 1 according to another embodiment of the present invention.

FIG. 3 is a perspective view of an appearance of a display system, explaining the LED part 42 of FIG. 1 according to another embodiment of the present invention.

The display system of FIG. 3 includes a ring-type stand 92 supporting an LCD module 30 such that the LCD module 30 is rotatable in a predetermined angle range. The LED part 42 of FIG. 1 is installed in a through hole 92A formed in the ring-type stand 92.

The LED part 42 includes a ring-type reflective layer 42D prepared on a wall surface of the through hole 92A, and a circular LED array 42C installed in a rear edge of the reflective layer 42D. When seen from a front side, the LED array 42C allows a light effect of a solar eclipse represented when the sun is shielded by the moon to appear, and the reflective layer 42D enhances the lighting effect of the solar eclipse even more.

The reflective layer 42D may be replaced by a color filter suitable for transmitting and scattering light of a predetermined color, and the circular LED array 42C may be replaced by an arc-shaped LED array on a lower surface of the support stand. Also in this case, a lighting effect of a solar eclipse is realized.

Figure 4:
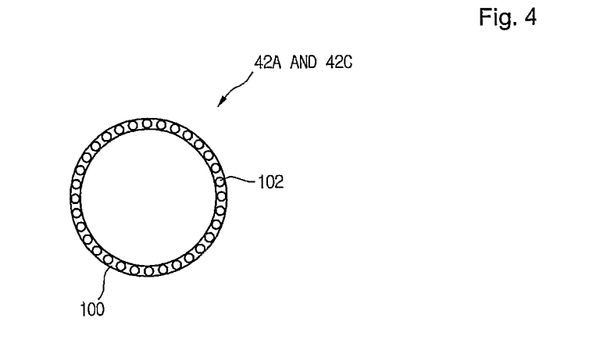
FIG. 4 is a view explaining in detail the LED array of FIGS. 2 and 3.

FIG. 4 is a view explaining in detail the LED arrays 42A and 42C of FIGS. 2 and 3.

Referring to FIG. 4, the LED arrays 42A and 42C include LEDs 102 arranged with a constant interval in an inside of a ring-type transparent member 100, and the LEDs 102 are individually operated by the light-emission controller 50 of FIG. 1.

Also, each LED 102 emits light at brightness controlled by a PWM signal, a current signal, or a voltage signal from the light-emission controller 50. The LEDs 102 may be replaced by light-emitting devices such as cold cathode fluorescent lamps (CCFL) and incandescent lamps.

Figure 5:
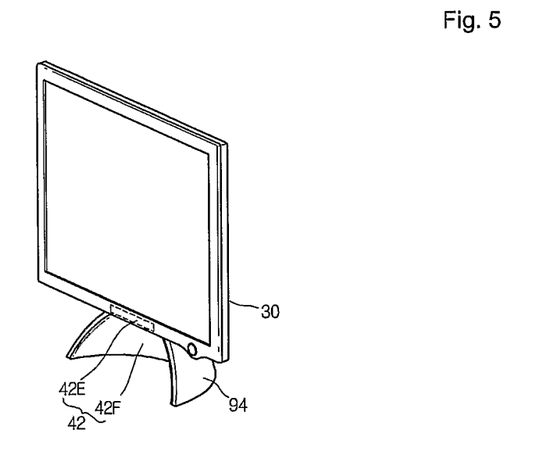
FIG. 5 is a perspective view of an appearance of a display system, explaining the LED part of FIG. 1 according to another embodiment of the present invention.

FIG. 5 is a perspective view of an appearance of a display system, explaining the LED part 42 of FIG. 1 according to another embodiment of the present invention.

In the display system of FIG. 5, an LCD module 30 is supported to be rotatable within a predetermined angle range by a support stand 94 having a semi-pot shape. The semi-pot shaped support stand 94 is installed such that a concave inner surface of the support stand 94 faces the same direction as that of a front side of the LCD module 30.

The LED part 42 of FIG. 1 is installed in the semi-pot shaped support stand 94 and the LCD module 30, so that the LED part 42 includes a light reflection plate 42F installed on an inner surface of the semi-pot shaped support stand 94, and an LED package 42E installed in a center at a rear lower end of the LCD module 30.

The LED package 42E is driven by a PWM signal, a current signal, or a voltage signal from the light-emission controller 50 of FIG. 1 and emit light at brightness controlled by one of these signals.

The LED package 42E is installed in the center at the rear lower end of the LCD module 30 so that emitted light can be illuminated onto the light reflection plate 42F. The light reflection plate 42F reflects light from the LED package 42E to generate a lighting effect, so that a user can experience a pleasant and comfortable atmosphere.

Also, at least one color thin film can be provided on a surface of the light reflection plate 42F to enhance such a lighting effect. For another embodiment, the LED package 42E may be installed on a lower surface of the LCD module 30 so that light can be illuminated onto the light reflection plate 42F.

Figure 6:
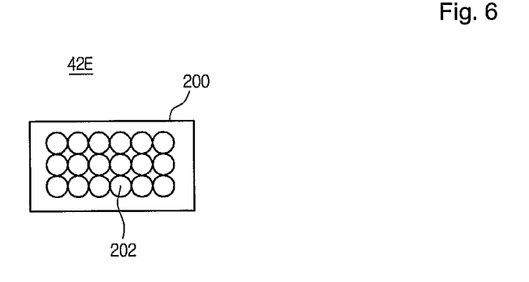
FIG. 6 is a view explaining in detail the LED package of FIG. 5.

FIG. 6 is a view explaining in detail the LED package of FIG. 5.

The LED package 42E will be described with reference to FIG. 6. The Led package 42E includes LEDs 202 arranged to be adjacent to one another on a substrate 200, and these LEDs 202 are individually driven by the light-emission controller 50 illustrated in FIG. 1. Each of the LEDs 202 emits light at brightness controlled in response to a PWM signal, a current signal, or a voltage signal from the light-emission controller 50. The LEDs 202 can be replaced by light-emitting devices such as cold cathode fluorescent lamps (CCFL) and incandescent lamps.

A method for controlling power of a display system according to the present invention will be described with reference to the accompanying drawings.

Figure 8:
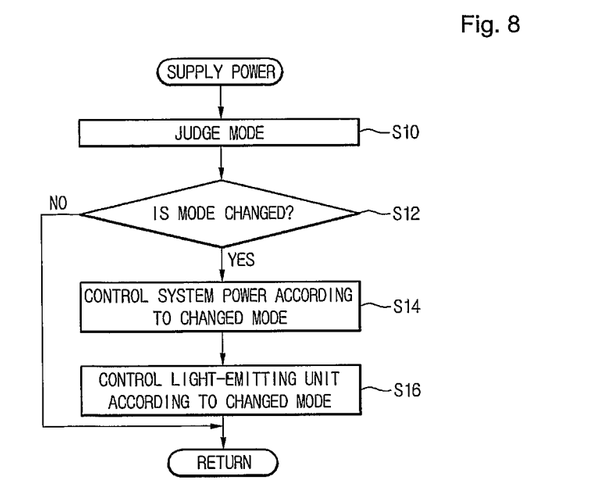
FIG. 8 is a flowchart of a method for controlling power of a display system according to the present invention.
Figure 9:
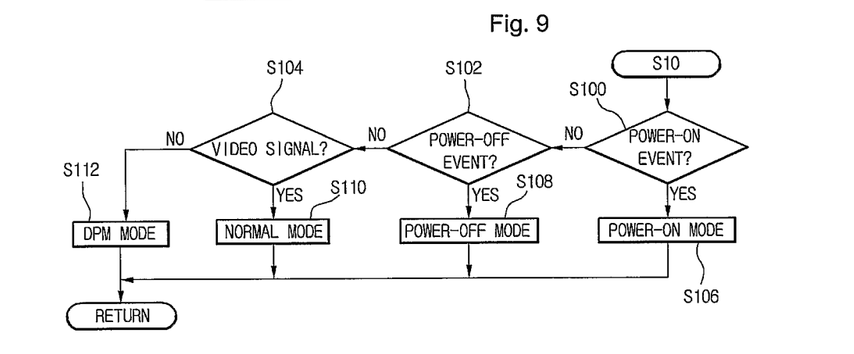
FIG. 9 is a flowchart illustrating a process for judging the mode illustrated in FIG. 8.
Figure 10:
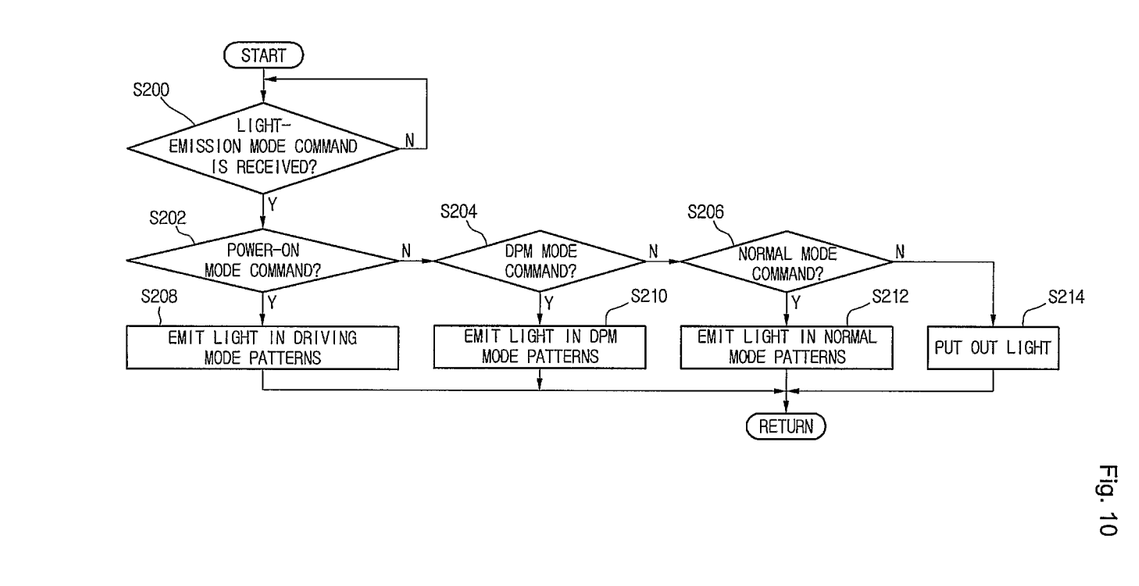
FIG. 10 is a flowchart illustrating a process for controlling the light-emitting part of FIG. 8.

FIG. 8 is a flowchart of a method for controlling power of a display system according to the present invention, FIG. 9 is a flowchart illustrating a process for setting the mode illustrated in FIG. 8, and FIG. 10 is a flowchart illustrating a process for controlling the light-emission of an LED according to the present invention.

A method for controlling power of a display system will be described with reference to FIG. 8. When power is supplied, a mode is judged (S10).

Whether there is a change in the judged mode is judged (S12).

Subsequently, when there is a change in the judged mode as a result of the judgment (S12), a system power is controlled to the changed mode (S14).

Also, the light-emitting unit is controlled to light-emitting patterns corresponding to the changed mode (S16).

A method for controlling power of a display system will be described with reference to FIG. 1. When an external DC current is supplied to the power source unit 60, the main controller 80 judges an operating mode of the display system by a predetermined period (S10).

Subsequently, the main controller 80 judges whether the judged operating mode of the display system has changed from a previous operating mode of the display system (S12). At this point, when there is no change in the operating mode, the main controller 80 returns to the operation S10.

On the other hand, when there is a change in the operation S12, the main controller 80 controls a power supplying operation of the power source unit 60 so that the display system can operates in the changed mode (i.e., the judged mode) (S14).

When the changed mode (or the judged mode) is a power-on mode and a normal mode, the main controller 80 controls the power source unit 60 to supply driving voltages MDV, SDV, and LDV to all corresponding circuits within the system.

When the changed mode (or the judged mode) is a power-saving mode (i.e., a DPM mode), the main controller 80 controls the power source unit 60 to cut off driving voltages (i.e., MDV and SDV) which are to be supplied to the LCD module 30, the video processor 20, and the first selection switch 12A, the AD converter 14, and the TMDS signal receiver 16 within the signal input unit 10. Simultaneously, the main controller 80 controls the power source unit 60 to supply light-emission driving voltages LDV to the second selection switch 12B, the main controller 80, the light-emitting unit 40, and the light-emission controller 50.

Last, when the changed mode (or the judged mode) is a power-off mode, the main controller 80 controls the power source unit 60 to cut off driving voltages MDV, SDV, and LDV which are to be supplied to the rest circuits that exclude the main controller 80 itself and the power switch 70. In this case, only the main controller 80 and the power switch 70 remain operable.

Subsequently, the main controller 80 applies a light-emission mode command corresponding to the judged mode to the light-emission controller 50. In response to the light-emission mode command, the light-emission controller 50 allows the LED part 42 within the light-emitting unit 40 to emit light in light-emitting patterns corresponding to the changed mode (i.e., the judged mode).

A method for judging a mode illustrated in FIG. 8 will be described with reference to FIG. 9. First, whether a power-on command is input is judged (S100).

Subsequently, when the power-on command is input as a result of the judgment in the operation S100, a power-on mode is set (S106).

When the power-on command is not input as a result of the judgment in the operation S100, whether a power-off command is input is judged (S102).

When the power-off command is input as a result of the judgment in the operation S102, a power-off mode is set (S108).

Also, when the power-off command is not input as a result of the judgment in the operation S102, whether a video signal (or a synchronization signal) is supplied is judged (S104).

Subsequently, when the video signal (or a synchronization signal) is supplied as a result of the judgment in the operation S104, a normal mode is set (S110).

Also, when the video signal (or a synchronization signal) is not supplied as a result of the judgment in the operation S104, a DPM mode is set (S112).

The above-described method for setting a mode shown in FIG. 9 will be described in association with the elements of FIG. 1. The main controller 80 examines whether a power-on event or a power-off event has occurred. When the power-on event or the power-off event has not occurred, the main controller 80 examines whether a video signal (or synchronization video data) is input (S100, S102, and S104).

That is, when a power-on event has occurred in the operation S100, the main controller 80 judges that a current operating mode of the display system is a power-on mode (S106). The power-on event may be a power-on command a user inputs using the power switch 70. Besides, the power-on event may be an auto (or self) power-on command that is generated from a timer program at a predetermine time by the main controller 80 itself.

The auto power-on command can be programmed by a user or a manufacturer to occur at a predetermined time.

In other words, when a power-on command by a user or an auto power-on command by the timer program occurs, the main controller 80 judges that a current operating mode of the display system is a power-on mode. The judged current mode s data is temporarily stored in one of registers within the main controller 80.

Unlike this, when a power-off event occurs in the operation S102, the main controller 80 judges that a current operating mode of the display system is a power-off mode (S108). At this point, the power-off event may be a power-off command a user inputs using the power switch 70. Besides, when a failure during a normal mode is maintained for a predetermined time, when a power-saving mode is maintained for a predetermined time, or when a user has made a reservation of a power-off, the power-off event may be an auto (of self) power-off command that is generated from a timer program by the main controller 80 itself.

Consequently, when a power-off command or an auto power-off command by the timer program occurs, the main controller 80 judges that a current operating mode of the display system is a power-off mode. The judged power-off mode s data is temporarily stored in a current mode s register located inside of the main controller 80.

When a video signal (or a synchronization signal) is input through one of the first to third input lines 11-15 in the operation S104, the main controller 80 judges that a signal input mode of the display system is a normal mode (S110).

Also, whether a video signal (or a synchronization signal) is input is determined by whether a synchronization signal is input from the second selection switch 12B to the main controller 80. When a synchronization signal is input from the second selection switch 12B, the main controller 80 regards a video signal is input through one of the first to third input lines 11-15, and judges that a current signal input mode of the display system is a normal mode.

Also, when a video signal (or a synchronization signal) is not input through one of the first to third input lines 11-15 in the operation S104, the main controller 80 examines whether a time section where a video signal (or a synchronization signal) is not input reaches a reference time set by a manufacturer or a user.

Also, when the time section where a video signal (or a synchronization signal) is not input reaches the reference time, the main controller 80 judges that a current signal input mode of the display system is a power-saving mode (S112). The judged signal input mode s data is temporarily stored in a signal mode s register located inside of the main controller 80.

Also, a process for controlling the light-emitting unit according to a changed mode will be described with reference to FIG. 10. First, whether a light-emitting mode command is received is judged (S200).

Subsequently, when the light-emitting mode command is received as a result of the judgment in the operation S200, whether a power-on mode command is input is judged (S202).

When the power-on mode command is input as a result of the judgment in the operation S202, a light-emitting diode is allowed to emit light in driving mode patterns (S208).

On the other hand, when the power-on mode command is not input as a result of the judgment in the operation S202, whether a DPM mode command is input is judged (S204).

When the DPM mode command is input as a result of the judgment in the operation S204, the light-emitting diode is allowed to emit light in DPM mode patterns (S210).

Also, when the DPM mode command is not input as a result of the judgment in the operation S204, whether a normal mode command is input is judged (S206).

When the normal mode command is input as a result of the judgment in the operation S206, the light-emitting diode is allowed to emit light in normal mode patterns (S212).

On the other hand, when the normal mode command is not input as a result of the judgment in the operation S206, the light-emitting diode is turned off (S214).

A process for controlling light-emission of a light-emitting diode of the display system according to the present invention will be described in more detail with reference to FIGS. 1, 7, and 10.

First, the light-emission controller 50 stands by until a light-emission mode command is received from the main controller 80 (S200). Also, the light-emission controller 50 examines the light-emission mode command in the operation S200 is one of a driving mode command, a DPM mode command, and a normal mode command (S202, S204, and S206).

When the light-emission mode command is examined to be the driving mode command in the operation S202, the light-emission controller 50 supplies a PWM signal (or a current signal of a maximum amount or a voltage signal of a maximum level) having a maximum impulse coefficient to at least two LEDs within the LED part 42 included in the light-emitting unit 40 to allow the LEDs of the LED part 42 to emit light at brightness of a maximum level as in the first sequential ELP1 of FIG. 7 (S208).

That is, when the LEDs within the LED part 42 emit light at brightness of a maximum level, a user can recognize that the display system operates in a driving mode in which an image begins to be displayed. For another embodiment, the light-emission controller 50 can supply a PWM signal (a current signal that gradually increases from zero to a maximum value or a voltage signal that gradually increases from zero to a maximum level) having a maximum impulse coefficient that gradually increases from zero to a maximum value, to the LEDs within the LED part 42 to allow the LEDs to emit light in patterns where brightness gradually increases from a light-out state to a maximum level as in the ELP4 of FIG. 7.

Brightness that gradually increases from the light-out state to the maximum level allows a user to recognize a driving mode in which the display system starts to display an image. For another embodiment, when the LEDs 102 are arranged in a ring type, the light-emission controller 50 may sequentially supply a PWM signal (or a current signal of a maximum amount (or a predetermined amount) or a voltage signal of a maximum level (or a predetermined level)) having a maximum (or a predetermined value) impulse coefficient to the LEDs along a clockwise (or counterclockwise) direction starting from one of the LEDs. At this point, the LEDs 102 arranged along a ring type are sequentially lighted along the clockwise (counterclockwise) direction.

For another embodiment, the light-emission controller 50 can supply a PWM signal (or a current signal of a maximum amount (or a predetermined amount) or a voltage signal of a maximum level (or a predetermined level)) having a maximum (or a predetermined value) impulse coefficient to the LEDs 102 so that the LEDs 102 are sequentially lighted along both clockwise and counterclockwise directions starting from one of the LEDs 102.

Patterns where the LEDs 101 sequentially emit light along both clockwise and counterclockwise directions starting from one of the LEDs 102 allow a user to recognize that the display system operates in a driving mode.

Also, for another embodiment, the light-emission controller 50 may supply a PWM signal (or a current signal or a voltage signal) having an impulse coefficient changing between zero and a maximum value (or a predetermined value) in turns in high speed to the LEDs within the LED part 42. In this case, patters in which the LEDs within the Led part 42 flicker in high speed allow a user to recognize the display system operates in a driving mode. It would be obvious to a person of an ordinary skill in the art that a driving mode can be displayed in various patterns besides the above-described five ELPs.

Also, when the light-emission mode command is a power-saving mode (i.e., a DPM mode) in the operation S204, the light-emission controller 50 supplies a PWM signal whose impulse coefficient gradually decreases from a maximum value to a minimum value (i.e., zero) in a predetermined section and then increases from a minimum value (i.e., zero) to a maximum value in a predetermined section, to at least two LEDs within the LED part 42 included in the light-emitting unit 40 (S210).

At this point, the LEDs within the LED part 42 repeat to emit light at brightness that gradually decreases from a maximum level to a minimum level and then emit light at brightness that gradually increases from a minimum level to a maximum level as shown in the first DLP pattern (DM-1) of the first sequential ELP1 shown in FIG. 7.

In other words, the LEDs repeat to emit light such that brightness of the LEDs gradually increases from a light-out state to maximum brightness and then gradually decreases until the light-out state. Such light-emission patterns in which fade-in and fade-out of brightness are repeated allow a user to recognize that the display system operates in a power-saving mode (i.e., a DPM mode).

Also, a period by which the fade-in and fade-out of brightness are repeated is set within about 1.5-4 seconds for which a user can experience stability, comfortableness, and pleasant feeling. It is desirable to set the period to a range of about 2-3 seconds close to a human breathing period. Unlike this, the light-emission controller 50 may supply a PWM signal (or a current signal or a voltage signal) having an impulse coefficient that repeatedly decreases from a maximum value to a minimum value (i.e., zero) to at least two LEDs within the LED part 42 included in the light-emitting unit 40.

At this point, the LEDs within the LED part 42 repeat to emit light at brightness that gradually decreases from a maximum level to a minimum level (i.e., a light-out state) as shown in the second DLP pattern (DM-2) of the second sequential ELP2 illustrated in FIG. 7. Such light-emission patterns in which the fade-out of brightness is repeated allow a user to recognize that the display system operates in a power-saving mode (i.e., a DPM mode).

A period by which the fade-out of the brightness is repeated is set within about 1.5-4 seconds for which a user can experience stability, comfortableness, and pleasant feeling. It is desirable to set the pedal to a range of about 2-3 seconds close to a human breathing period.

Also, the light-emission controller 50 may supply a PWM signal (or a current signal or a voltage signal) having an impulse coefficient that repeatedly increases from a minimum value (i.e., zero) to a maximum value to at least two LEDs within the LED part 42 included in the light-emitting unit 40. At this point, the LEDs within the LED part 42 repeat to emit light at brightness that gradually increases from a minimum level (i.e., a light-out state) to a maximum level as shown in the third DLP pattern (DM-3) of the third sequential ELP3 illustrated in FIG. 7.

Such light-emission patterns in which the fade-in of brightness is repeated allow a user to recognize that the display system operates in a power-saving mode (i.e., a DPM mode). Also, a period by which the fade-in of the brightness is repeated is set within about 1.5-4 seconds for which a user can experience stability, comfortableness, and pleasant feeling. It is desirable to set the pedal to a range of about 2-3 seconds close to a human breathing period.

For another embodiment, the light-emission controller 50 may supply a PWM signal (or a current signal or a voltage signal) having a maximum (or a predetermined) impulse coefficient to the LEDs within the LED part 42 by a relatively long period. At this point, the LEDs within the LED part 42 emit light by a relatively long period as shown in the fourth DPM pattern (DM-4) of the fourth sequential ELP4 illustrated in FIG. 7.

In other words, the light-emission controller 50 allows the LEDs to flicker in relatively low speed. In this case, a flickering period of the LED is set within about 1.5-4 seconds for which a user can experience stability, comfortableness, and pleasant feeling. It is desirable to set the flickering period to a range of about 2-3 seconds close to a human breathing period.

Such light-emission patterns where the LEDs flicker in slow speed allow a user to recognize that the display system operates in a power-saving mode (i.e., a DPM mode). For another embodiment, when the LEDs 102 are arranged in a ring type as illustrated in FIG. 4, the light-emission controller 50 may supply a PWM signal (or a current signal of a maximum amount (or a predetermined amount) or a voltage signal of a maximum level (or a predetermined level)) having a maximum (or a predetermined) impulse coefficient to the LEDs 102 so that some of the LEDs 102 emit light along a clockwise (or counterclockwise) direction in turns starting from one of the LEDs 102.

At this point, the LEDs 102 arranged in a ring type are sequentially lighted in turns along a clockwise (or counterclockwise) direction. Such light-emission patterns in which the LEDs are lighted in turns along a clockwise (or counterclockwise) direction allow a user to recognize that the display system operates in a power-saving mode (i.e., a DPM mode).

Also, a period by which the LEDs are sequentially lighted in turns along a clockwise (or counterclockwise) direction is set within about 1.5-4 seconds for which a user can experience stability, comfortableness, and pleasant feeling.

It is desirable to set the period to a range of about 2-3 seconds close to a human breathing period. Also, the LED sequentially lighted in turns may be lighted at high brightness, and the rest LEDs may be lighted at low (weak) brightness.

Also, when the light-emission mode command is a normal mode command in the operation S206, the light-emission controller 50 supplies a PWM signal (or a current signal of a maximum amount or a voltage signal of a maximum level) having a maximum impulse coefficient to each of the LEDs 102 within the LED part 42 included in the light-emitting unit 40 to allow the LEDS within the LED part 42 to emit light at brightness of a maximum level as shown in the third and fourth normal patterns (NM-3 and NM-4) of the third and fourth sequential emitting light patterns ELP3 and ELP4 illustrated in FIG. 7 (S212).

The light-emission patterns in which the LEDs within the LED part 42 emit light at brightness of the maximum level allow a user to recognize the display system operates in a normal mode in which an image is normally displayed. Unlike this, when a normal mode is received, the light-emission controller 50 can supply a PWM signal (or a current signal or a voltage signal) having a predetermined impulse coefficient lower than a maximum value to the LEDs within the LED part 42.

At this point, the LEDs within the LED part 42 emit light at brightness of a predetermined intermediate level lower than the maximum level as shown in the first and second normal patterns (NM-1 and NM-2) of the first and second sequential emitting light patterns ELP1 and ELP2 illustrated in FIG. 7. The light-emission patterns in which the LEDs within the LED part 42 emit light at brightness of a predetermined intermediate level allow a user to recognize that the display system operates in a normal mode in which an image is normally displayed.

The light-emission patterns in which the LEDs emit light at brightness of a predetermined intermediate level allow a user to easily and comfortably view an image displayed on the LCD module 30.

For another embodiment, when the LEDs 102 are arranged in a ring type as illustrated in FIG. 4, the light-emission controller 50 may supply a PWM signal (or a current signal of a maximum amount (or a predetermined amount) or a voltage signal of a maximum level (or a predetermined level)) having a maximum (or a predetermined) impulse coefficient to the LEDs 102 so that some of the LEDs 102 emit light along a clockwise (or counterclockwise) direction in turns starting from one of the LEDs 102.

At this point, the LEDs 102 arranged in a ring type are sequentially lighted in turns along a clockwise (or counterclockwise) direction. Such light-emission patterns in which the LEDs are lighted in turns along a clockwise (or counterclockwise) direction allow a user to recognize that the display system operates in a normal mode.

Also, a period by which the LEDs are sequentially lighted in turns along a ring is set within about 1.5-4 seconds for which a user can experience stability, comfortableness, and pleasant feeling. It is desirable to set the period to a range of about 2-3 seconds close to a human breathing period. Also, the LED sequentially lighted in turns may be lighted at high brightness, and the rest LEDs may be lighted at low (weak) brightness.

On the other hand, when the light-emission mode command is judged not a normal mode command in the operation S206, the light-emission controller 50 judges that the light-emission mode is a power-off mode command and puts out all of the LEDs in response to the power-off mode command (S204).

As described above, since the method for controlling light-emission of the LED illustrated in FIG. 10 is performed by the light-emission controller 50, a program load of the main controller 80 is reduced. Accordingly, it would be obvious to a person of an ordinary skill in the art that the flowchart illustrated in FIG. 10 can be performed by the main controller 80 even when a program load increases.

INDUSTRIAL APPLICABILITY

The present invention can be applicable to an image display apparatus such as a monitor and a television.

The invention claimed is:

1. A display system comprising:
a power source to supply power;
a signal input circuit to receive signals;
a video signal processor to convert a format of video signals received from the signal input circuit into a displayable format;
a display electrically connected with the power source to display an image corresponding to a signal from the video signal processor;
a light emitter electrically connected with the power source and including at least two light sources; and
a controller to judge an operating mode based on a signal from the signal input circuit and to control power supplied to the display and the light emitter depending on the judged operating mode,
wherein the light emitter includes a plurality of light sources coupled to a supporter of the display and a cylindrical reflective body that reflects a light emitted from the light emitter, wherein the supporter includes a through hole, the cylindrical reflective body is disposed at a location adjacent to the through hole, and the plurality of light sources are disposed at an edge of the cylindrical reflective body,
wherein the controller changes a light-emitting pattern of the light sources based on the judged operating mode and one or more power commands,
wherein the operating mode includes a power-on mode and a power-off mode, wherein the power-on mode includes a normal mode, a power-saving mode, and a driving mode, and
wherein the normal mode is a mode during which both a color signal and a synchronization signal are received by the signal input circuit, the power-saving mode is a mode during which one of a color signal and a synchronization signal is not received by the signal input circuit, the driving mode is a mode in which the display starts to display a video when a power-on command is received and the driving mode is a mode that informs a user of the operating mode changes to the normal mode sequentially, and the power-off mode is a mode that does not supply to the display system, and
the controller gradually and periodically changes a brightness level of light emitted by the light emitter when the operating mode is the power saving mode.

2. The display system according to claim 1, wherein the light sources are arranged substantially in a ring.

3. The display system according to claim 1, wherein the supporter is a stand of the display.

4. The display system according to claim 1, wherein the controller variably controls power supplied to the light emitter according to the judged operating mode.

5. The display system according to claim 1, wherein the light sources are LEDs (light-emitting diodes).

6. The display system according to claim 1, wherein the controller judges whether a synchronization signal is received by the signal input circuit, and when there is no synchronization signal received by the signal input circuit for a predetermined time, the controller reduces power supplied to the display, and increases power of the light emitter.

7. The display system according to claim 1, wherein the operating mode is one of a normal mode during which both a color signal and a synchronization signal are received by the signal input circuit or a power-saving mode during which neither a color signal nor a synchronization signal is received by the signal input circuit with a predetermined period of time.

8. The display system according to claim 7, wherein the controller controls the light emitter to emit light at a brightness that increases from a reduced power state at a predetermined rate when the operating mode is judged to be a power-saving mode.

9. The display system according to claim 8, wherein the controller controls the brightness of light from the light emitter based on a repetition period that lies substantially in a range of 1.5-4 seconds.

10. The display system according to claim 7, wherein the controller controls the light emitter to emit light at a brightness that decreases from an on-state at a predetermined rate when the operating mode is judged to be a power-saving mode.

11. The display system according to claim 7, wherein the controller controls the light emitter to emit light at a brightness that increases and decreases with a predetermined period when the operating mode is judged to be a power-saving mode.

12. The display system according to claim 7, wherein the controller controls brightness of the light emitter in response to one of a PWM signal, a current amount, or a voltage level when the operating mode is judged to be a power-saving mode.

13. The display system according to claim 7, wherein the controller controls the light emitter to flicker with a predetermined period when the operating mode is judged to be a power-saving mode.

14. The display system according to claim 7, wherein the controller controls the light emitter to maintain a lighting state at a predetermined level when the operating mode is judged to be a normal mode.

15. A display system comprising:
a power source to supply supplying power;
a signal input circuit to receive signals;
a video signal processor to convert a format of video signals received from the signal input circuit into a displayable format;
a display to display an image corresponding to a signal from the video signal processor;
a light emitter that includes a plurality of light sources coupled to a supporter of the display and a cylindrical reflective body that reflects a light emitted from the light emitter, wherein the supporter includes a through hole, the cylindrical reflective body is disposed at a location adjacent to the through hole, and the plurality of light sources are disposed at an edge of the cylindrical reflective body;
a first controller to judge an operating mode based on a signal from the signal input circuit and to control power supplied to the display and the light emitter based on the judged operating mode;
a second controller to control supply of power to at least one of the light emitter or the display, wherein the first controller changes a light-emitting pattern of the light sources based on the judged operating mode and one or more power commands,
wherein the operating mode includes a power-on mode and a power-off mode, the power-on mode includes a normal mode, a power-saving mode, and a driving mode, and
wherein the normal mode is a mode during which both a color signal and a synchronization signal are received by the signal input circuit, the power-saving mode is a mode during which one of a color signal and a synchronization signal is not received by the signal input circuit, the driving mode is a mode in which the display starts to display a video when a power-on command is received and the driving mode is a mode that informs a user of the operating mode changes to the normal mode sequentially, and the power-off mode is a mode that does not supply to the display system, and
the first controller gradually and periodically changes a brightness level of light emitted by the light emitter when the operating mode is the power saving mode.

16. The display system according to claim 15, wherein the second controller comprises a brightness level adjustor to adjust a brightness level of the light emitter.

17. A method for controlling power of a display system, the method comprising:
judging an operating mode of a display system based on an input video signal;
changing, by a light emitter, a light-emitting pattern of light sources based on the judged operating mode and one or more power commands; and
when the operating mode is a power-saving mode, reducing power of a display of the display system and increasing power to a light emitter coupled to a support of the display,
wherein the operating mode includes a power-on mode and a power-off mode, the power-on mode includes a normal mode, a power-saving mode, and a driving mode, and
wherein the normal mode is a mode during which both a color signal and a synchronization signal are received by a signal input circuit, the power-saving mode is a mode during which one of a color signal and a synchronization signal is not received by the signal input circuit, the driving mode is a mode in which the display starts to display a video when a power-on command is received and the driving mode is a mode that informs a user of the operating mode changes to the normal mode sequentially, and the power-off mode is a mode that does not supply to the display system,
wherein the changing of the light-emitting pattern includes:
changing, gradually and periodically, a brightness level of light emitted by the light emitter when the operating mode is the power saving mode,
wherein the light emitter includes the light sources coupled to a supporter of the display and a cylindrical reflective body that reflects a light emitted from the light emitter,
wherein the supporter includes a through hole,
the cylindrical reflective body is disposed at a location adjacent to the through hole, and
the plurality of light sources are disposed at an edge of the cylindrical reflective body.

18. The method according to claim 17, wherein the judging of the operating mode comprises judging the operating mode depending on whether one of a synchronization signal or a color signal is received, and when a synchronization signal and a color signal is not received for a predetermined time, judging the operating mode to be the power-saving mode.

19. The method according to claim 18, further comprising, when the operating mode is judged to be the power-saving mode, variably supplying power to the light emitter.

20. The method according to claim 18, further comprising, when the operating mode is judged to be the power-saving mode, supplying power to cause the light emitter to flicker by a period of 1.5-4 seconds.

21. The display system according to claim 17, wherein the one or more power commands are user-initiated power commands.

22. The display system according to claim 17, wherein the one or more power commands include at least one of a first command to increase power or a second command to decrease power.

23. The display system according to claim 6, wherein:
when there is no synchronization signal received by the signal input circuit for a predetermined time, the controller turns off power to the display and turns on power of the light emitter.

24. The display system according to claim 8, wherein the reduced power state is an off state.

25. The display system according to claim 15, wherein the first controller changes the light-emitting pattern of the light sources based on said one or more power commands.

26. The display system according to claim 15, wherein the first controller changes the light-emitting pattern of the light sources based on the judged operating mode.

27. The display system according to claim 15, wherein the second controller turns off or turns on the supply of power to at least one of the light emitter or the display.

28. The method according to claim 17, wherein said reducing includes:
turning off power of the display and turning on power to the light emitter coupled to the support of the display when the operating mode is the power-saving mode.

* * * * *